Figure 1:
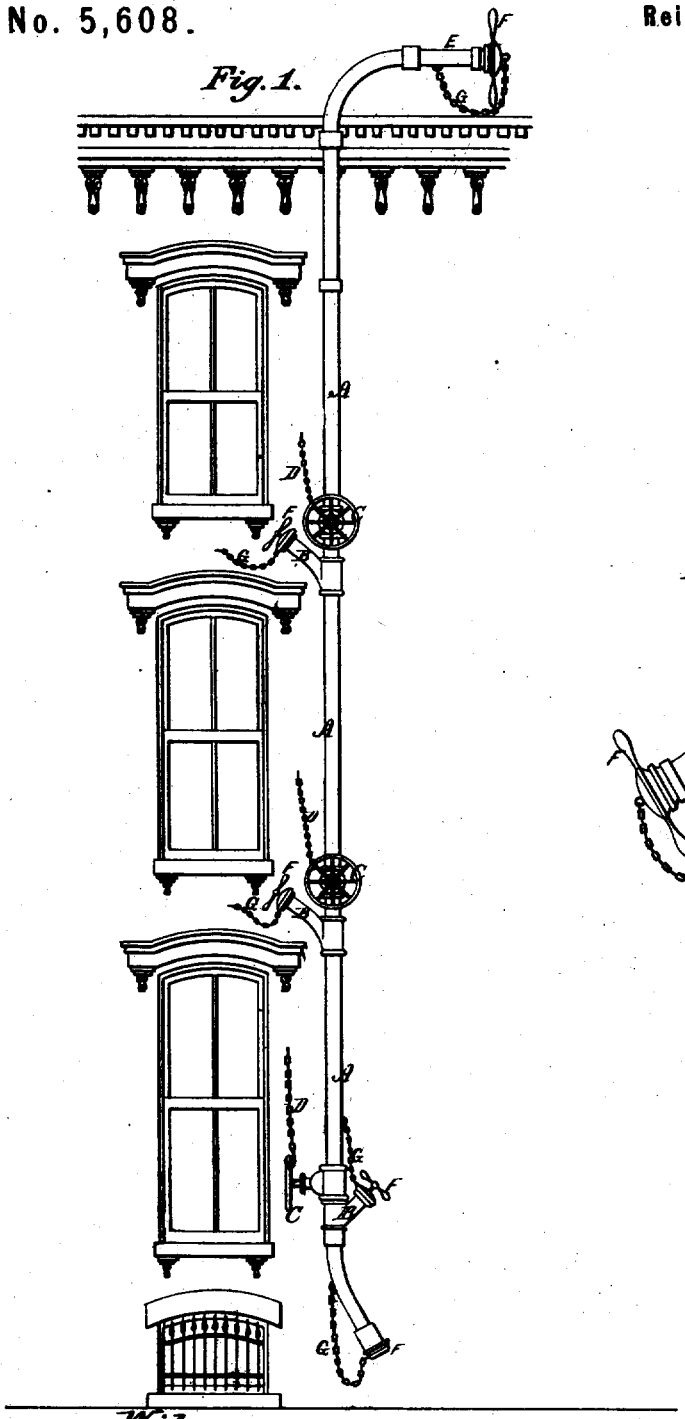

H. PALMIERI.

Stationary Fire-Pipes for Buildings.

No. 5,608. Reissued Oct. 14, 1873.

Witnesses.

John Dyler

Arthur S. McIntire

Inventor.

Henry Palmieri

By Atty. Wm. Cruel Intire

N. PETERS, Photo-Lithographer, Washington, D. C.

UNITED STATES PATENT OFFICE.

HENRY PALMIERI, OF NEW YORK, N. Y., ASSIGNOR OF ONE-HALF INTEREST TO GORDON MONGES.

IMPROVEMENT IN STATIONARY FIRE-PIPES FOR BUILDINGS.

Specification forming part of Letters Patent No. 136,537, dated March 4, 1873; reissue No 5,608, dated October 14, 1873 application filed September 1, 1873.

*To all whom it may concern:*

Be it known that I, HENRY PALMIERI, of New York, N. Y., have invented a new and useful Improvement in Stationary Fire-Pipes for Buildings, of which the following is a specification:

My invention relates to a novel auxiliary to the fire department. It has for its object to save time in commanding elevations, to increase the force and supply of water at the discharge-point, to save the contents of buildings from damage by accidental discharges of water from leaks and bursting of hose, obviating the necessity of, and consequent labor in, dragging hose through the different stories of a burning dwelling or warehouse in order to reach the fire, and also to relieve the fireman from the risks incurred in attempts to elevate hose by ladders; and to these ends my invention consists in arranging upon the interior or exterior of the walls of buildings a system or line of pipes, provided with branch pipes and hose-connections at such points and in such manner as will be hereinafter more fully set forth.

Previous to my invention all means to facilitate the operations of the firemen have been imperfect in one or more particulars, thus rendering every and all of the devices with which I am familiar inoperative and defective. One of the serious defects to which I allude is the contraction at some one or more points, either by valves or by abrupt joints or angles. This difficulty induces an unequal pressure, resulting almost invariably in the bursting of the hose attached to the engine. Another is the wasting of water at a point or points where it is not necessarily required; and still another is the inability to make connections at any intermediate connecting-nipple without the risk of having the same leak inside of the building; and yet another is the absence of any provision to secure the connecting-nipples against accidental injury, which might render a perfect connection impossible. By my invention all these difficulties are overcome, and a perfectly-operating device is the result.

It must be borne in mind that in a system of pipes such as my invention has in view it must be perfect in every particular at all times, for the least defect will render the whole absolutely useless in a case of emergency, and an obstacle rather than an auxiliary to the fire department.

To enable those skilled to fully understand my invention, I will refer, in my description thereof, to the accompanying drawing forming part of this specification, and in which—

Figure 2:
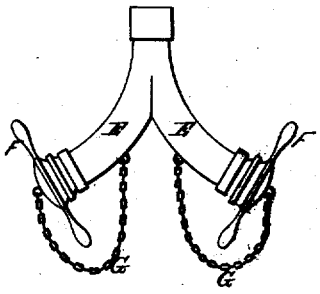

Figure 1 is a detail or partial elevation of a three-story-and-basement building having arranged thereon my improved pipe; and Fig. 2 is a detail view of the roof-branch, which may be used for submerging the roof or directing the flow at any given point thereof.

A is an ordinary iron pipe, about two and a half inches in diameter, secured to the wall in a vertical position, upon the outside thereof, by suitable fastenings, or preferably built up on the inside of the walls, with the branch connections B projecting outward or outside in a curved line, and terminating at such point as to be within convenient reach from the sill of the window. Upon the roof is a branch, E, likewise curved, and, like all other branches, provided with suitable screw-threaded nipples for hose-connections. The lowest extremity of the pipe A, or "street-end," as it may be called, is slightly curved outward to facilitate the connection with the engine. This lower end and the extreme or coupling ends of all branches are provided with screw-caps F and chains G, for perfectly securing the ends air and water tight, the chains holding the sealing-caps against loss or misplacement. The cap on the street-connection is designed to perfectly protect the thread against accidental or mischievous defacement, in order that no time shall be lost in forming the connection with the engine.

I have shown, at C, Ludlow valves immediately above each branch connection, secured openly by a chain, D, which is unhooked in order to have the valves close automatically. The object of these valves is to prevent the ascent of the column above that point at which it is required, so that the force may not be impaired by the vertical weight of an unnecessary column of water. These valves are, however, not necessary where a good joint is made between the connections and the sealing-caps; for, if the caps are kept on, as they should be, above the point at which the water is used, the confined air within the pipe forms a somewhat yielding cushion, sufficiently solid to prevent the water from rising to such a height as to materially affect the force, and yet yielding enough to give to any sudden obstruction at the exit end of the pipe, and thus relieve the engine-hose of undue strain.

The operation of my improved device is as follows: Supposing the fire to exist within the second story. The entire apparatus is found in a hermetically-closed condition. The screw-cap on the street-connection is taken off and the connection made with the engine-hose. The screw-cap in the second story is now taken off and connection made with any suitable length of hose, when everything is now in readiness for starting the engine to work. The water is forced upward and driven out through the branch arm B at the second story into the hose, from which it is directed toward any given point. The column of water not only supplies this branch, but has a tendency to rise above it in the vertical pipe A, but, meeting with the contained air, (which cannot escape by reason of the upper screw-caps being in place,) compresses it, thus forming a somewhat yielding cushion, as before alluded to. The operation at any other altitude or connection will be obvious.

It will be readily understood that there is no waste of water at points where it is not required, and the force acquired from the engine is jealously husbanded and made use of just at the point where it is most required. A superfluous amount of hose is dispensed with, and consequent damage to premises by trailing hose through the same, is avoided, as well as any liability of leakage or bursting of hose within the building at any points where it is desirable that it should be kept dry.

It is advisable that a short section of hose should be kept within convenient reach on each story of a building, in order to more readily form the connection with the branches; but, of course, this forms no part of my invention, the gist of which rests in the idea of the arrangement of pipes, as hereinbefore specified, so as to avoid all the objections to the known methods, and, at the same time, providing a safe and reliable means for utilizing a given supply and pressure of water at any given point or points.

What I claim as of my invention, and desire to secure by Letters Patent, is—

The combination, with a vertical conducting water-pipe, arranged upon the outside or inside of the wall, as described, of the series of curved connections or branch pipes, at different altitudes, provided with sealing-caps, substantially in the manner and for the purposes hereinbefore set forth.

Witness my hand and seal this 27th day of August, A. D. 1873.

H. PALMIERI. [L. S.]

Witnesses:

JACOB DU BOIS,

C. M. BENJAMIN.